(12) United States Patent
Linde et al.

(10) Patent No.: US 11,075,384 B2
(45) Date of Patent: Jul. 27, 2021

(54) BATTERY CELL COMPRISING AN ULTRA THIN LAYER OF CARBON FIBERS

(71) Applicants: AIRBUS DEFENCE AND SPACE GMBH, Taufkirchen (DE); AIRBUS OPERATIONS GMBH, Hamburg (DE)

(72) Inventors: Peter Linde, Buxtehude (DE); Leif Asp, Mölndal (SE); Dan Zenkert, Lidingö (SE); Maciej Wysocki, Mölndal (SE); Fredrik Ohlsson, Rävlanda (SE); Christian Metzner, Gmund (DE)

(73) Assignees: Airbus Defence and Space GmbH, Taufkirchen (DE); Airbus Operations GmbH, Hamburg (DE)

( * ) Notice: Subject to any disclaimer, the term of this patent is extended or adjusted under 35 U.S.C. 154(b) by 207 days.

(21) Appl. No.: 16/196,546

(22) Filed: Nov. 20, 2018

(65) Prior Publication Data

US 2019/0181452 A1 Jun. 13, 2019
US 2020/0235402 A9 Jul. 23, 2020

(30) Foreign Application Priority Data

Dec. 11, 2017 (DE) ...................... 10 2017 129 475.9

(51) Int. Cl.
*H01M 4/86* (2006.01)
*H01M 4/80* (2006.01)
(Continued)

(52) U.S. Cl.
CPC ............ *H01M 4/625* (2013.01); *B64D 41/00* (2013.01); *H01M 4/366* (2013.01); *H01M 4/523* (2013.01);
(Continued)

(58) Field of Classification Search
CPC .... H01M 4/625; H01M 4/926; H01M 4/9083; H01M 4/8657; H01M 4/806;
(Continued)

(56) References Cited

U.S. PATENT DOCUMENTS 5,492,782 A * 2/1996 Higley ................... H01M 4/26
429/127
5,747,195 A  5/1998 Alamgir et al.
(Continued)

FOREIGN PATENT DOCUMENTS

CN       104037405      *  9/2014  ........ H01M 10/0525
EP     0 331 275 A3       3/1991
(Continued)

OTHER PUBLICATIONS

Machine translation of CN 104037405, Li et al., 2014 (Year: 2014).*

(Continued)

*Primary Examiner* — Kwang Han
(74) *Attorney, Agent, or Firm* — Jenkins, Wilson, Taylor & Hunt, P.A.

(57) ABSTRACT

A battery cell includes an anode, a cathode, and a separator between the anode and the cathode, wherein at least one of the anode or the cathode includes at least a carbon fiber ply comprising carbon fibers, the carbon fiber ply having a thickness of less than 90 micrometers. Also disclosed are a battery and an aircraft including such battery cell, and a method for manufacturing such battery cell.

8 Claims, 2 Drawing Sheets

(51) Int. Cl.
| | |
|---|---|
| *H01M 50/44* | (2021.01) |
| *H01M 50/431* | (2021.01) |
| *B64D 41/00* | (2006.01) |
| *H01M 4/36* | (2006.01) |
| *H01M 4/52* | (2010.01) |
| *H01M 10/0565* | (2010.01) |
| *H01M 4/62* | (2006.01) |
| *H01M 4/92* | (2006.01) |
| *H01M 4/90* | (2006.01) |

(52) U.S. Cl.
CPC ......... *H01M 4/806* (2013.01); *H01M 4/8657* (2013.01); *H01M 4/9083* (2013.01); *H01M 4/926* (2013.01); *H01M 10/0565* (2013.01); *H01M 50/431* (2021.01); *H01M 50/44* (2021.01); *H01M 2220/20* (2013.01); *H01M 2300/0082* (2013.01)

(58) Field of Classification Search
CPC .... H01M 2/1613; H01M 4/366; H01M 4/523; H01M 10/0565; H01M 2300/0082; H01M 2220/20; H01M 50/44; H01M 50/431; B64D 41/00; Y02E 60/10; Y02E 60/50
See application file for complete search history.

(56) References Cited

U.S. PATENT DOCUMENTS

| | | |
|---|---|---|
| 2008/0280164 A1 | 11/2008 | Atanasoski et al. |
| 2011/0104571 A1 | 5/2011 | Zhamu et al. |
| 2014/0162116 A1* | 6/2014 | Stalder ............... H01M 2/0285 429/179 |
| 2017/0349297 A1 | 12/2017 | Linde et al. |

FOREIGN PATENT DOCUMENTS

| | | | | |
|---|---|---|---|---|
| EP | 2 124 276 A1 | | 11/2009 | |
| EP | 2445997 | * | 5/2012 | ............ H01M 4/139 |
| EP | 2 738 831 A1 | | 6/2014 | |
| EP | 2455997 B1 | * | 8/2017 | .......... H01M 4/1391 |
| WO | WO 2014/033276 A1 | | 3/2014 | |

OTHER PUBLICATIONS

Tsai et al., "Thin Ply Composites," 46th AIAA/ASME/ASCE/AHS/ASC Structures, Structural Dynamics & Material Conference, 6 pages, Austin, Texas, Apr. 18-21, 2005.
German Office Action for Application No. 10 2017 129 475.9 dated Sep. 7, 2018.
Intention to Grant for Application No. 18202232.7 dated May 11, 2020.
Asp et al., "Structural power composites," Composites Science and Technology, vol. 101, pp. 41-61, Elsevier, Amsterdam, NL, Jul. 5, 2014.
Zhang et al., "Rice paper-derived 3D-porous carbon films for lithium-ion batteries," Electrochimica Acta, vol. 89, pp. 310-316, Elsevier Science Publishers, Barking, GB, Nov. 23, 2012.
Extended European Search Report for Application No. 18202232.7 dated Mar. 19, 2019.

* cited by examiner

BATTERY CELL COMPRISING AN ULTRA THIN LAYER OF CARBON FIBERS

CROSS-REFERENCE TO RELATED APPLICATION

This application claims priority to German Patent Application No. 10 2017 129 475.9 filed Dec. 11, 2017, the entire disclosure of which is incorporated by reference herein.

TECHNICAL FIELD

The disclosure herein relates to batteries and in particular to batteries with a high ratio of energy per unit of volume and per unit of weight. More particularly, it relates to battery cells with a high ratio of energy per unit of volume and per unit of weight and to methods of manufacturing such battery cells.

BACKGROUND

The volume and weight of a battery are an important limitation of its use in many applications. The current limitations in the energy density of the batteries induce that the volume and weight dedicated to batteries in many applications such as mobile electronic devices or electrical vehicles remains important in regards to the total volume available for systems. In particular in vehicles such as aircrafts the volume and the weight available for the batteries are very small. Lightweight batteries with a high energy density are essential factors in the design of electrically powered vehicles, in particular in the aeronautical sector. Moreover, compact and lightweight batteries mean more space and weight is available for other functional systems, for payload or for embarking more batteries.

Besides, in order to reduce the overall weight of an electrically powered vehicle, the batteries will have to have more than one function, and be used as mechanical components of the vehicle as well. Current batteries, in particular lithium-based batteries are particularly fragile to deformation and to failure under mechanical stress.

Also, the charging rate of batteries is another essential factor in rendering the use of electrical batteries in the transportation sector industrially feasible.

EP0331275 and U.S. Pat. No. 5,747,195 disclose battery collectors comprising a layer comprising carbon fiber for the manufacturing of a lightweight solid-state battery.

However, the compactness of these batteries, as well as their energy density and in particular their density is not optimal.

Moreover such battery cells have limited mechanical properties, which render them subject to failure, and which in any case does not allow to use these batteries as structural elements.

SUMMARY

The disclosure herein aims to provide a compact and lightweight battery. The disclosure herein also aims at providing a battery with a high energy density. The disclosure herein also aims at providing a battery with an improved charging rate. The disclosure herein also aims at providing a battery with good mechanical properties and in particular a battery that can endure mechanical stress. The disclosure herein aims at providing a safe battery, in particular a battery that would meet the aeronautics safety requirements. The disclosure herein furthermore aims at providing a battery that is easy to manufacture and to assemble.

The disclosure herein proposes a battery cell comprising:
an anode,
a cathode,
a separator between the anode and the cathode, wherein at least one of the anode or the cathode comprises at least a carbon fiber ply comprising carbon fibers, the carbon fiber ply having a thickness of less than 90 micrometers.

In the whole text, the term 'less than' is used to mean 'equal to or less than'.

In the whole text, the term 'electrode' is used as a standard denomination for anode or cathode, therefore applying to the anode and/or the cathode.

In the whole text, the terms 'fiber' and 'filament' are used indifferently to designate a single elongated piece of material which is non-divisible except by breaking the fiber or filament apart.

By providing a very thin cathode and/or anode, a battery cell of the disclosure herein is very compact and light. Therefore a very compact and light battery may be obtained.

A battery according to the disclosure herein may be made particularly thin, such that it may be placed in many different places of a vehicle.

Thanks to very thin plies in a battery according to the disclosure herein, the distance to travel for the electrons between an anode and an electrode is short and therefore the charging duration of such battery is beneficially short. Moreover, the power that such battery may provide may be high, which is particularly beneficial when used in a vehicle, in particular in an aircraft to provide high power during take-off for example.

The use of carbon fiber has the advantage of being compatible with at least the current most widespread battery type based on lithium: the lithium-ions batteries. Besides the carbon fibers are both lightweight and mechanically very resistant to many forms of mechanical stress. It is therefore beneficial to use carbon fibers to form an electrode of a battery cell according to the disclosure herein because such battery cell may therefore assume other functions than the energy storage function such as for example a mechanical function.

Besides the carbon fiber ply is beneficially flexible.

Indeed such a thin carbon fiber ply may easily be flexed and therefore it may allow to create batteries of any shape. Therefore such batteries may be used with a secondary function such as for example a mechanical function and/or an aerodynamic function.

A thin battery may be used in different portions of a vehicle, and in particular of an aircraft, which do not need much thickness, more particularly if the battery can assume other functions that energy storage such as for example mechanical load bearing. For example the body of a terrestrial vehicle or the fuselage of an aircraft may only need to be of one millimeter in some areas. In such areas, only batteries having very thin battery cells may be used. The disclosure herein allows it by making possible electrodes comprising very thin plies.

A battery according to the disclosure herein may be used at least as a portion of a structural part of a vehicle, in particular of an aircraft.

In the whole text the term 'structural part' is understood as any part with a mechanical function such as a frame, a skin of a body or fuselage, an interior fitting, a cabin lining, a floor panel, etc. The structural part may be subjected to at least some mechanical loads in at least some mode of functioning of the aircraft, including aerodynamic loads.

The thickness the carbon fiber ply may beneficially have a thickness of less than 50 micrometers, more particularly of less than 40 micrometers, for example of about or less than 30 micrometers.

The carbon fiber ply may comprise a spread tow tape.

Such spread tow tape may have been obtained by spreading a tow comprising carbon fibers into a thin carbon fiber ply. The spreading of the tow may be made through many known techniques such as for example a mechanical compression of the tow over an edge, vacuum suction, etc.

The spread tow tape beneficially has a thickness of less than 90 micrometers. The spread tow tape may beneficially have a thickness of less than 50 micrometers, more particularly of less than 40 micrometers, for example of about or less than 30 micrometers.

The carbon fiber ply may comprise in average less than ten carbon filaments in its thickness, in particular less than five carbon filaments, for example about two or three filaments.

Beneficially the carbon fibers of the carbon fiber ply are arranged unidirectionally side by side. This allows obtaining a ply with a very high mechanical resistance to longitudinal strain.

The fibers of the carbon fiber ply are close to each other with a low variance of the distances between two neighboring fibers. Thereby the maximal distance between two consecutive fibers is low, thus improving the mechanical resistance of a composite material comprising such fiber ply.

In a ply obtained by spreading a tow, the distance between the individual filaments is lower than the distance between two tows used as such to form a ply. Therefore the mechanical resistance in a direction orthogonal to the main direction of the fibers is also higher in a spread tow ply. This may be explained by the fact that only the resin impregnating the ply between the fibers provides mechanical strength in the portion between the filaments (respectively between the tows), and the resin has a lower mechanical strength than the fibers.

The spread tow tape may be impregnated with a resin so as to form a carbon fiber ply. Alternatively or in combination, a consolidation step may be applied to the spread tow tape in which the tape is submitted to heat and/or pressure so as to melt or soften a thermoplastic surrounding the carbon fibers. This allows the carbon fibers to stick together in the form of a thin tape.

A spread tow tape has a very low percentage of crimp (or undulation). Therefore the ratio between the surface of fibers on each face of the tape and the total length of fibers in the tape is very high. The surface of the fiber ply is therefore particularly flat. This allows for better mechanical and electrical contact between the tape and other elements such as for example another ply or tape.

Thus the amount of exposed carbon fibers in each ply of the battery cell is very high, so that a high percentage of carbon fibers are active elements of the battery cell and the energy density of the battery is also very high. The energy density of the battery cell is thus higher than the energy density of conventional battery cells. Indeed the spread carbon-fiber tow ply is very flat on a large surface, such that the contact surface between the different layers and components of the battery is very high. In particular the contact surface between the electrolyte and an electrode comprising a face with such spread tow ply is optimal and allows an easy transportation of charges between the electrode and the electrolyte. This moreover allows for an excellent charging rate of such batteries.

At least one of the anode or the cathode may comprise a carbon fiber laminate comprising a plurality of carbon fiber plies.

Thereby an electrode according to the disclosure herein has a sufficient mechanical resistance to be handled and placed in the battery cell during manufacturing. Besides, such battery cells also have good mechanical properties, such as high tensile modulus, compression strength and interlaminar shear strength.

Such laminate may in particular comprise one or more spread tow tapes. Thin and flat plies such as spread tow tapes also allows to obtain a laminate with a very thin inter-plies distance A thin inter-plies distance also ensures a good electrical transmission between two successive plies, and a good mechanical resistance.

The carbon fiber laminate may comprise at least four plies, more particularly at least eight plies.

The plies of a laminate according to the disclosure herein may be attached to each other according to different techniques, such as for example: stitched together, woven (or interlaced), glued, heat-pressed, etc.

The plies of a laminate according to the disclosure herein may be arranged so as to obtain a laminate with a similar mechanical resistance in multiple directions. The plies may be arranged with an axial symmetry around an axis placed in the middle of the plies stack. The plies may be arranged so as to obtain a non-crimp fabric by orientating at least two plies with a 45 degrees angle between the longitudinal directions of their respective fibers. For example a laminate may comprise, from one of its faces to its opposite face, eight plies arrange as follows: a first ply may be placed with fibers oriented in a reference direction of zero degrees, a second ply with fibers oriented in a direction at 90 degrees, a third ply with fibers oriented at 45 degrees, a fourth ply with fibers oriented at 135 degrees, a fifth ply with fibers oriented at 45 degrees, a sixth ply with fibers oriented at 135 degrees, a seventh ply with fibers oriented at 90 degrees, an eighth ply with fibers oriented at zero degrees.

According to the disclosure herein, it is therefore possible to obtain a battery cell with a total thickness of less than one millimeter, although having eight plies in each electrode, a separator and two electrolyte layers between the separator and the electrodes. Thereby such battery has a high, isotropic, mechanical resistance and a very low thickness, allowing to use it in some portions of a vehicle where only a very thin layer of material is necessary such as for example the skin of the fuselage of an aircraft.

The carbon fiber laminate may comprise a plurality of carbon fiber plies, each ply having a thickness of less than 90 micrometers.

The carbon fiber laminate may comprise a plurality of plies each having a thickness of less than 50 micrometers, more particularly of less than 40 micrometers, for example of about or less than 30 micrometers.

The carbon fiber laminate may comprise alternatively or in combination:
  plies comprising fibers comprising one material only,
  plies comprising fibers from a first material and at least a second different material,
  plies comprising fibers of a first material and plies comprising fibers of at least a second different material.

A battery cell or a battery according to the disclosure herein may comprise at least one ply comprising carbon fibers, and/or glass fibers, and/or bore fibers, and/or aramid fibers. Such ply may for example be used for its electrically insulating properties. In particular the carbon fiber laminate may comprise at least one ply comprising carbon fibers, and/or glass fibers, and/or bore fibers, and/or aramid fibers.

The anode and the cathode each comprise at least a carbon fiber ply having a thickness of less than 90 micrometers.

A battery according to the disclosure herein is particularly thin and compact when thin plies are used both in the anode and the cathode.

The separator may comprise at least a glass fiber ply comprising glass fibers, the glass fiber ply having a thickness of less than 100 micrometers.

A thin separator also allows obtaining a compact and light battery cell. The separator may have a thickness of less than 50 micrometers, more particularly of less than 40 micrometers, for example of about or less than 30 micrometers.

The glass fiber ply may be obtained by spreading a tow comprising glass fibers into a thin glass fiber ply.

The contact surface of the separator with the electrolyte is also improved by the use of a spread tow ply. It permits a fast transportation of charges at the interfaces between the separator and the electrolyte layers situated on each side, on opposite faces of the separator. Moreover, a thin separator also reduces the duration of transportation of charges from one side of the separator to the other side of the separator thereby reducing the battery's charging duration.

The separator may also comprise a plurality of fiber plies, in particular a plurality of glass fiber plies. Similar to the electrode plies, the plies of the separator may be in amount and arranged so as to obtain a mechanical resistance similar in many directions.

The battery cell may comprise a solid-state polymer layer forming a first electrolyte between the anode and the separator, and a solid-state polymer layer forming a second electrolyte between the cathode and the separator.

The solid-state polymer layers forming electrolyte layers may be doped with ions so as to facilitate the transport of charges, for example lithium ions, between an electrode and the separator.

The cathode may comprise carbon fibers coated with a ferritic oxide.

Thereby a cathode is formed for a lithium ions battery cell.

The carbon fibers may have an average diameter of between 1 and 10 micrometers.

More particularly, the carbon fibers may have an average diameter between 3 and 8 micrometers, for example between 5 and 7 micrometers.

This allows for particularly thin and compact batteries.

The carbon fiber ply may have an area weight of less than 100 grams per square centimeter ($g/cm^2$).

A battery cell according to the disclosure herein is particularly lightweight and thin.

The carbon fiber ply may have an area weight of less than 50 $g/cm^2$, in particular less than 30 $g/cm^2$.

Also the glass fiber ply of the separator may have an area weight of less than 100 grams per square centimeter ($g/cm^2$), in particular of less than 50 $g/cm^2$, for example less than 30 $g/cm^2$.

The carbon fiber ply may comprise a spread tow fabric.

The carbon fiber ply may comprise a woven spread tow fabric in which spread tow tapes are woven with each other.

The disclosure herein also extends to a battery comprising at least a battery cell according to the disclosure herein. In particular the disclosure herein extends to a battery comprising a plurality of battery cells according to the disclosure herein. The plurality of battery cells may be electrically connected in series and/or in parallel.

The disclosure herein also extends to a vehicle and in particular to an aircraft comprising at least a battery cell according to the disclosure herein. The disclosure herein envisions an aircraft comprising a battery according to the disclosure herein.

The disclosure herein also encompasses a vehicle and more particularly an aircraft comprising at least a battery cell having a first function of storing energy and at least a second function such as a mechanical function. In particular the disclosure herein also extends to an aircraft comprising at least one structural part comprising at least a battery cell. In particular the aircraft comprises at least one structural part comprising at least a battery cell according to the disclosure herein, so that the battery cell supports mechanical loads in at least some operation modes of the aircraft. The battery cell or battery according to the disclosure herein may form, in an aircraft, at least part of at least one of the following structural elements: a frame—including a rib, a longeron, etc., a skin of a body or fuselage, an interior fitting including a dividing wall, a galley, an overhead locker, a seat, a cabin lining, etc., a floor panel, etc.

The disclosure herein also extends to a method for the manufacturing of a battery cell comprising:
    forming an anode,
    forming a cathode,
    obtaining a separator and placing the separator between the anode and the cathode,
    wherein it further comprises:
    spreading a tow comprising carbon fibers for obtaining a thin carbon fiber ply,
    integrating at least part of the thin carbon fiber ply in at least one of the anode or the cathode for forming the anode or the cathode.

Spreading a tow of fibers allow creating a particularly thin layer of fibers, which may also be named a spread tow tape. Besides, spreading a tow of fibers allow the fibers to have a high degree of orientation along one predetermined direction. Moreover spreading a tow of fibers allow the fibers to be close to each other with a low variance of the distances between two neighboring fibers; thereby the maximal distance between two consecutive fibers is low, thus improving the mechanical resistance of a composite material comprising such fiber ply.

An electrode of the battery cell is formed with at least one thin carbon fiber ply. The fibers may be coated by an electrode coating, such as a ferritic oxide coating for example on the carbon fibers of the cathode.

The carbon fiber ply may be impregnated with a polymer. The impregnating polymer may be any resin, such as a thermoset or thermoplastic resin. Such resin may be treated with ionic liquid, such as Li-ionic liquid, before curing in order to ensure a good transportation of Lithium ions in the electrode.

The method may comprise a step of stacking a plurality of thin carbon fiber plies together In particular, the method may comprise a step of laminating a plurality of thin carbon fiber plies together, so as to obtain a carbon fiber laminate. Such carbon fiber laminate may have a high mechanical resistance, combined to a very small thickness. In particular at least four carbon fiber plies, or more particularly at least eight carbon fiber plies, may be laminated together.

The laminate may thereafter be impregnated by a resin. Alternatively each ply may be pre-impregnated before the laminating step.

An electrode (anode or cathode) may comprise one or more layers (or plies) of material. Each ply of an electrode may be of the same or of different materials. In particular, an electrode may comprise at least a first carbon fiber ply and at least a second ply comprising a different material such as fibers of a different material and/or a different matrix material.

A method according to the disclosure herein may beneficially comprise spreading the tow comprising carbon fibers so as to obtain a thin carbon fiber ply with a thickness of less than 90 micrometers.

The carbon fibers may be selected to have a predetermined diameter adapted to obtain a carbon fiber ply of less than 90 micrometers. The carbon fiber ply may beneficially have a thickness of less than 50 micrometers, more particularly of less than 40 micrometers, for example of about or less than 30 micrometers. The carbon fibers may have an average diameter of between 1 and 10 micrometers.

The separator may be obtained by a process similar to the process for the forming of an electrode. For the forming of the separator, glass fibers instead of carbon fibers may be used.

The disclosure herein also extends to other possible combinations of features described in the above description and in the following description relative to the figures. In particular, the disclosure herein extends to batteries comprising features described in relation to the battery cell and/or the method for manufacturing a battery cell; the disclosure herein extends to a battery cell comprising features described in relation to the battery and/or the method for manufacturing a battery cell; and, the disclosure herein extends to methods for manufacturing a battery cell comprising features described in relation to the battery and/or the battery cell.

BRIEF DESCRIPTION OF THE DRAWINGS

Some specific example embodiments and aspects of the disclosure herein are described in the following description in reference to the accompanying figures.

DETAILED DESCRIPTION

Figure 1:
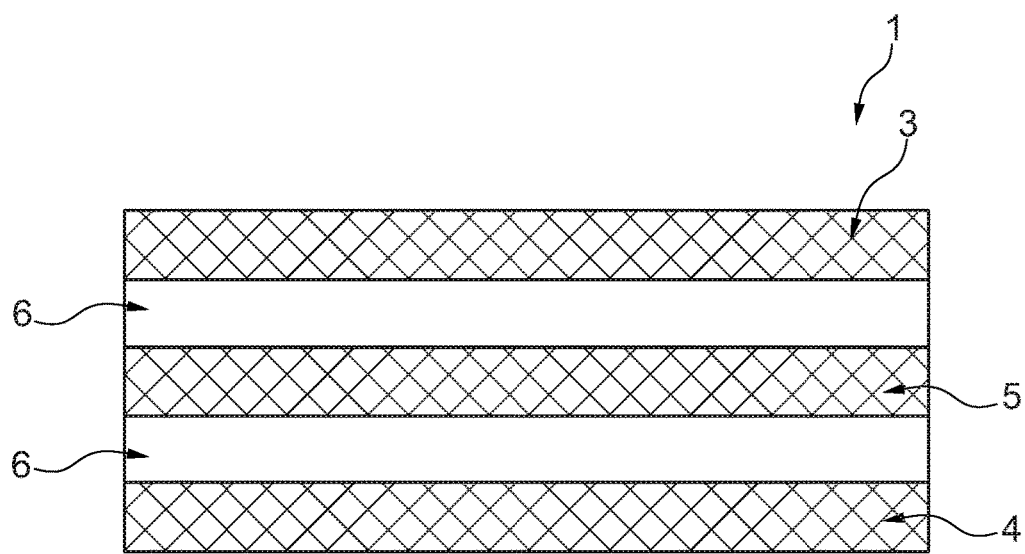
FIG. 1 is a schematic representation of a cross-section of a battery cell embodiment according to the disclosure herein.

In FIG. 1 a battery cell 1 is represented which comprises a cathode 3, an anode 4, and a separator 5. The separator is separated from the anode and the cathode respectively by two electrolytes 6.

The anode 4 and the cathode 3 have each been obtained by the lamination of eight plies of carbon fiber spread tow tapes, impregnated with a matrix such as for example a resin of HexFlow® RTM6 commercialized by Hexcel®.

Figure 3:
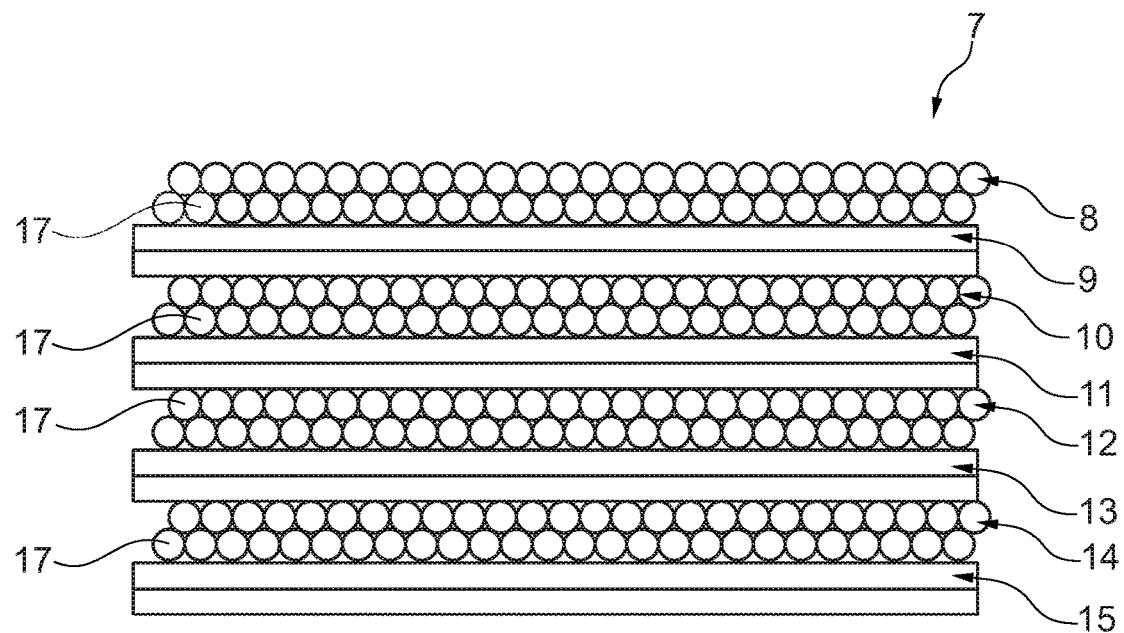
FIG. 3 is a schematic representation of a laminate of a battery electrode according to the disclosure herein.

The carbon fiber laminate may be of the type described with FIG. 3. After impregnation, the laminated may be cured by application of heat and/or pressure for example.

Previous to the impregnation of the carbon fiber plies of the cathode 3, these may be coated with a ferritic oxide, for example by bathing the carbon fiber plies in a liquid solution comprising ferritic oxide.

The total thickness of the anode 4 may be of about 650 micrometers. The total thickness of the battery cell shown on FIG. 1 may be less than 4.0 mm, for example of about 2.0 mm.

Similarly the separator 5 may have been obtained by the lamination of eight plies of glass fiber spread tow tapes, impregnated with a matrix such as for example a resin of HexFlow® RTM6 commercialized by Hexcel®.

Other elements of the battery cell such as charge collectors and electrical connectors are not represented.

Figure 2:
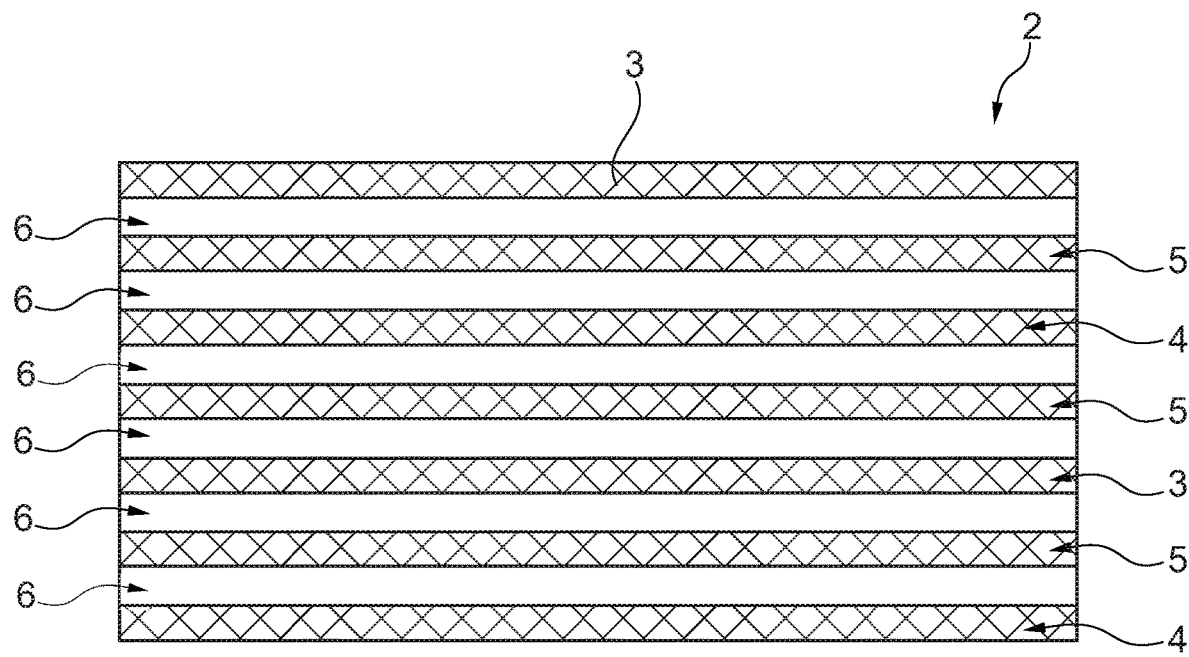
FIG. 2 is a schematic representation of a battery comprising a plurality of battery cells according to the disclosure herein.

In FIG. 2 a battery 2 comprising a plurality of anodes 4 and cathodes 3 is represented. Each pair of cathode and anode is separated by a separator 5 and two layers of electrolytes 6. The anodes 4 and cathodes 3 situated between two successive separators 5 are part of two battery cells (one on each of their faces) simultaneously.

The total thickness of the battery shown on FIG. 2 may be less than 10 mm, in particular less than 2 mm, for example of about 0.65 mm. This very low thickness of a battery may allow to ingrate such battery in many different places of a vehicle, in particular of an aircraft. Besides such battery has high mechanical resistance, due to the high mechanical resistance of each of its layer, and in particular due to the high mechanical resistance of the carbon fiber laminate integrated in the electrodes 3, 4 of the battery cells. Such battery may thus for example form a portion of a wing skin, of a fuselage, of a cabin floor or of a frame of an aircraft.

The compactness, alignment and low thickness of fiber plies also allows a higher energy density. The energy density of the battery cell is thus higher than the energy density of conventional battery cells. The energy density of such battery is estimated to be multiplied by up to 2 compared to batteries using conventional thick carbon fiber plies.

In FIG. 3, a laminate 7 for an anode or a cathode of a battery cell according to the disclosure herein is represented.

The laminate 7 comprises a plurality of carbon fiber plies 8, 9, 10, 11, 12, 13, 14, 15. Each carbon fiber ply is made of a plurality of carbon fibers 17, the carbon fibers being for the most part generally oriented along a predetermined direction in the ply.

In the example of FIG. 3 each ply comprises about 2 carbon fibers in its thickness. Each carbon fiber may have an average diameter of about 6 micrometer, such that the total thickness of each carbon fiber ply may be of about 12 micrometer. The total thickness of the carbon fiber laminate 7 may thus be of less than 100 micrometer, for example of about 96 micrometer.

Each carbon fiber ply may be pre-impregnated with a HexFlow® RTM6 resin commercialized by Hexcel®. Eight carbon fiber plies may then be stacked and laminated together.

A carbon fiber laminate may be obtained for example by a process in which resin is impregnated into the carbon fiber plies under pressure. To do so, the preform is enclosed to a vacuum bag or laid into a closed tool. The textile preform comprising carbon fiber plies and the resin are preheated to 120° C. A pressure differential is applied between the resin pod and the preform (vacuum or pressure) so as to obtain an impregnation of the fiber plies by the resin. After impregnation, the impregnated laminate is heated up to 180 degrees Celsius, and cured for 90 minutes. It is afterwards cooled down to less than 70 degrees Celsius and de-molded.

The carbon fiber plies may be arranged so as to increase the mechanical resistance of the laminate. In particular, if a first carbon fiber ply 15 is disposed with its carbon fiber in a predetermined direction of reference at zero degrees, a second carbon fiber ply 14 may be placed on it with fibers oriented at 90 degrees, a third carbon fiber ply 13 may be placed on it with fibers oriented at 45 degrees, a fourth carbon fiber ply 12 with fibers oriented at 135 degrees, a fifth carbon fiber ply 11 with fibers oriented at 45 degrees, a sixth carbon fiber ply 10 with fibers oriented at 135 degrees, a seventh carbon fiber ply 9 with fibers oriented at 90 degrees, an eighth carbon fiber ply 8 with fibers oriented at zero degrees. Thereby the mechanical resistance of the laminate is increased in multiple directions.

Figure 4:
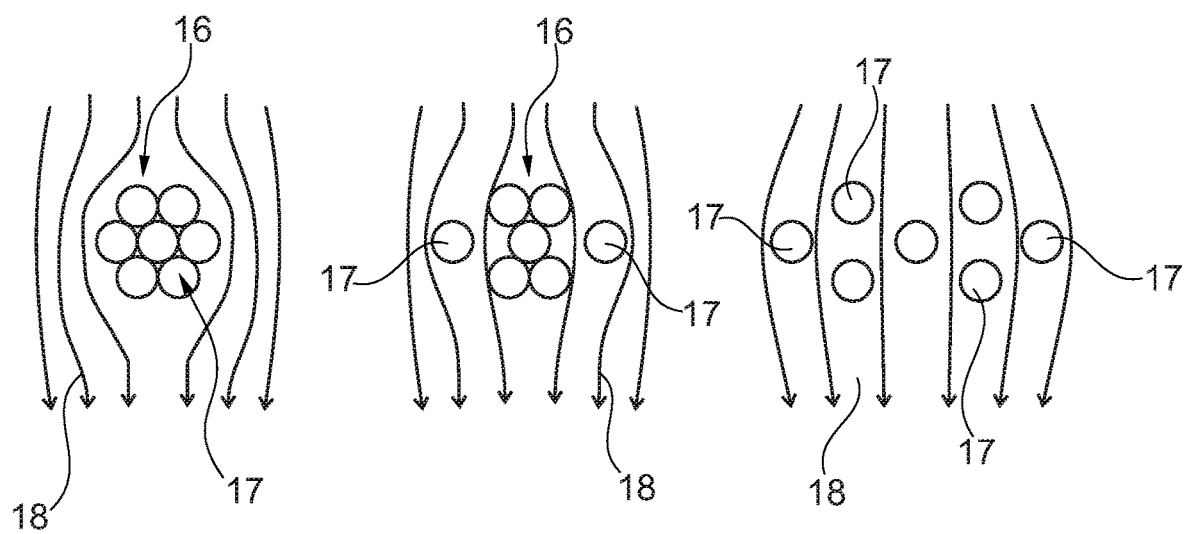
FIG. 4 is a schematic representation of a step for spreading a tow of a method according to the disclosure herein.

In FIG. 4 a step of spreading a carbon fiber tow is represented. In this step a carbon fiber tow 16 is submitted to an air flow 18 in an orthogonal direction compared to the longitudinal direction of the carbon fiber tow 16. The suction of the air flow 18 on the sides of the carbon fiber tow 16 leads to the detachment of some carbon fibers 17 on each side of the carbon fiber tow 16, towards directions orthogonal to the air flow 18 and orthogonal to the longitudinal direction of the carbon fiber tow 16. During the process the carbon fibers 17 of the carbon fiber tow 16 are separated from each other in a flat configuration leading to the formation of a spread tow tape of carbon fibers 17. Such spread tow tape may then be used to form a carbon fiber ply.

The disclosure herein is not limited to the specific embodiments herein disclosed as examples. The disclosure herein also encompasses other embodiments not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A battery cell comprising:
   an anode;
   a cathode;
   a separator between the anode and the cathode; and
   a solid-state polymer layer forming a first electrolyte between the anode and the separator, and a solid-state polymer layer forming a second electrolyte between the cathode and the separator;
   wherein the anode and the cathode each comprises a carbon fiber laminate, wherein the carbon fiber laminate comprises a plurality of carbon fiber plies comprising carbon fibers, each carbon fiber ply having a thickness of equal to or less than 90 micrometers, wherein each carbon fiber ply comprises a spread tow tape having a thickness of less than 40 micrometers.

2. The battery cell according to claim 1, wherein the separator comprises at least a glass fiber ply comprising glass fibers, the glass fiber ply having a thickness of equal to or less than 100 micrometers.

3. The battery cell according to claim 1, wherein the cathode comprises carbon fibers coated with a ferritic oxide.

4. The battery cell according to claim 1, wherein the carbon fibers have an average diameter of between 1 and 10 micrometers.

5. The battery cell according to claim 1, wherein the carbon fiber ply has an area weight of equal to or less than 100 grams per square centimeter ($g/cm^2$).

6. A battery comprising at least one battery cell according to claim 1.

7. An aircraft comprising at least one structural part comprising at least a battery cell according to claim 1.

8. A method for manufacturing a battery cell comprising:
   forming an anode;
   forming a cathode;
   obtaining a separator and placing the separator between the anode and the cathode;
   forming a first electrolyte by layering a solid-state polymer layer between the anode and the separator and forming a second electrolyte by layering a solid-state polymer layer between the cathode and the separator;
   spreading a tow comprising carbon fibers for obtaining a thin carbon fiber ply, the thin carbon fiber ply having a thickness of less than or equal to about 90 micrometers and the tow having a thickness of less than 40 micrometers;
   integrating a plurality of the thin carbon fiber plies as a carbon fiber laminate into the anode and into the cathode for forming the anode and the cathode.

* * * * *